United States Patent
Poupyrev

(10) Patent No.: US 9,588,625 B2
(45) Date of Patent: Mar. 7, 2017

(54) INTERACTIVE TEXTILES

(71) Applicant: Google, Inc., Mountain View, CA (US)

(72) Inventor: Ivan Poupyrev, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/504,061

(22) Filed: Oct. 1, 2014

(65) Prior Publication Data

US 2016/0048235 A1 Feb. 18, 2016

Related U.S. Application Data

(60) Provisional application No. 62/038,152, filed on Aug. 15, 2014.

(51) Int. Cl.
*G06F 3/045* (2006.01)
*G06F 3/044* (2006.01)
(Continued)

(52) U.S. Cl.
CPC ......... *G06F 3/044* (2013.01); *A47G 19/2227* (2013.01); *D03D 1/0088* (2013.01);
(Continued)

(58) Field of Classification Search
USPC .................................. 345/174, 179, 173, 156
See application file for complete search history.

(56) References Cited

U.S. PATENT DOCUMENTS 6,032,450 A 3/2000 Blum
6,080,690 A 6/2000 Lebby et al.
(Continued)

FOREIGN PATENT DOCUMENTS

CN 202887794 4/2013
EP 0161895 11/1985
(Continued)

OTHER PUBLICATIONS

"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
(Continued)

*Primary Examiner* — Thuy Pardo
(74) *Attorney, Agent, or Firm* — Wolfe-SBMC

(57) ABSTRACT

This document describes interactive textiles. An interactive textile includes a grid of conductive thread woven into the interactive textile to form a capacitive touch sensor that is configured to detect touch-input. The interactive textile can process the touch-input to generate touch data that is useable to control various remote devices. For example, the interactive textiles may aid users in controlling volume on a stereo, pausing a movie playing on a television, or selecting a webpage on a desktop computer. Due to the flexibility of textiles, the interactive textile may be easily integrated within flexible objects, such as clothing, handbags, fabric casings, hats, and so forth. In one or more implementations, the interactive textiles may be integrated within various hard objects, such as by injection molding the interactive textile into a plastic cup, a hard casing of a smart phone, and so forth.

20 Claims, 15 Drawing Sheets

(51) Int. Cl.
*A47G 19/22* (2006.01)
*D03D 1/00* (2006.01)
*G06F 3/041* (2006.01)
*G06F 3/0488* (2013.01)
*A41D 1/00* (2006.01)

(52) U.S. Cl.
CPC ........ *G06F 3/0416* (2013.01); *G06F 3/04883* (2013.01); *A41D 1/005* (2013.01); *D10B 2401/18* (2013.01); *G06F 2203/04102* (2013.01); *G06F 2203/04103* (2013.01); *G06F 2203/04104* (2013.01)

(56) References Cited

U.S. PATENT DOCUMENTS

| | | | |
|---|---|---|---|
| 6,210,771 | B1 | 4/2001 | Post et al. |
| 6,340,979 | B1 | 1/2002 | Beaton et al. |
| 6,492,980 | B2 | 12/2002 | Sandbach |
| 6,493,933 | B1 | 12/2002 | Post et al. |
| 7,299,964 | B2 | 11/2007 | Jayaraman et al. |
| 7,317,416 | B2 | 1/2008 | Flom et al. |
| 7,365,031 | B2 | 4/2008 | Swallow et al. |
| 7,578,195 | B2 | 8/2009 | DeAngelis et al. |
| 8,169,404 | B1 | 5/2012 | Boillot |
| 8,334,226 | B2 | 12/2012 | Nhan et al. |
| 8,560,972 | B2 | 10/2013 | Wilson |
| 2004/0259391 | A1 | 12/2004 | Jung et al. |
| 2005/0069695 | A1 | 3/2005 | Jung et al. |
| 2008/0065291 | A1 | 3/2008 | Breed |
| 2009/0115617 | A1 | 5/2009 | Sano et al. |
| 2010/0225562 | A1 | 9/2010 | Smith |
| 2011/0003664 | A1 | 1/2011 | Richard |
| 2011/0234492 | A1 | 9/2011 | Ajmera et al. |
| 2012/0144934 | A1* | 6/2012 | Russell ............... G01P 15/0891 73/862.626 |
| 2012/0268416 | A1* | 10/2012 | Pirogov ................ G06F 3/044 345/174 |
| 2012/0280900 | A1 | 11/2012 | Wang et al. |
| 2013/0194173 | A1 | 8/2013 | Zhu et al. |
| 2014/0143678 | A1 | 5/2014 | Mistry et al. |
| 2014/0316261 | A1 | 10/2014 | Lux et al. |
| 2015/0002391 | A1 | 1/2015 | Chen |
| 2015/0091858 | A1* | 4/2015 | Rosenberg ............ G06F 3/0414 345/174 |
| 2015/0145805 | A1 | 5/2015 | Liu |
| 2015/0199045 | A1* | 7/2015 | Robucci ................ G06F 3/044 345/174 |
| 2015/0261320 | A1* | 9/2015 | Leto .................... C09D 175/04 345/179 |
| 2015/0268027 | A1 | 9/2015 | Gerdes |
| 2015/0332075 | A1 | 11/2015 | Burch |
| 2016/0048236 | A1 | 2/2016 | Poupyrev |
| 2016/0103500 | A1 | 4/2016 | Hussey et al. |
| 2016/0320852 | A1 | 11/2016 | Poupyrev |
| 2016/0320853 | A1 | 11/2016 | Lien et al. |
| 2016/0320854 | A1 | 11/2016 | Lien et al. |
| 2016/0345638 | A1 | 12/2016 | Robinson et al. |
| 2016/0349845 | A1 | 12/2016 | Poupyrev et al. |

FOREIGN PATENT DOCUMENTS

| | | |
|---|---|---|
| GB | 2443208 | 4/2008 |
| JP | 2006234716 | 9/2006 |
| JP | 2011102457 | 5/2011 |
| WO | WO-0175778 | 10/2001 |
| WO | WO-2005033387 | 4/2005 |
| WO | WO-2008061385 | 5/2008 |
| WO | WO-2010032173 | 3/2010 |
| WO | WO-2014019085 | 2/2014 |
| WO | WO-2014204323 | 12/2014 |
| WO | WO-2015022671 | 2/2015 |

OTHER PUBLICATIONS

"International Search Report and Written Opinion", Application No. PCT/US2015/044774, Nov. 3, 2015, 12 pages.
Holleis,"Evaluating Capacitive Touch Input on Clothes", Proceedings of the 10th International Conference on Human Computer Interaction, Jan. 1, 2008, 10 pages.
Wijesiriwardana,"Capacitive Fibre-Meshed Transducer for Touch & Proximity Sensing Applications", IEEE Sensors Journal, IEEE Service Center, Oct. 1, 2005, 5 pages.
"International Search Report and Written Opinion", Application No. PCT/US2016/024267, Jun. 20, 2016, 13 pages.
"International Search Report and Written Opinion", Application No. PCT/US2016/024273, Jun. 20, 2016, 13 pages.
Patel,"Applications of Electrically Conductive Yarns in Technical Textiles", International Conference on Power System Technology (POWECON), Oct. 30, 2012, 6 pages.
Zhang,"Study of the Structural Design and Capacitance Characteristics of Fabric Sensor", Advanced Materials Research (vols. 194-196), Feb. 21, 2011, 8 pages.
"Corrected Notice of Allowance", U.S. Appl. No. 14/312,486, Oct. 28, 2016, 4 pages.
"International Search Report and Written Opinion", Application No. PCT/US2016/034366, Nov. 7, 2016, 13 pages.
"Non-Final Office Action", U.S. Appl. No. 14/518,863, Oct. 14, 2016, 16 pages.
"Notice of Allowance", U.S. Appl. No. 14/312,486, Oct. 7, 2016, 15 pages.
"Notice of Allowance", U.S. App. No. 14/582,896, Nov. 7, 2016, 5 pages.
"Pre-Interview Communication", U.S. Appl. No. 14/513,875, Oct. 21, 2016, 3 pages.
Pu,"Gesture Recognition Using Wireless Signals", Oct. 2014, pp. 15-18.

* cited by examiner

INTERACTIVE TEXTILES

PRIORITY APPLICATION

This application claims priority under 35 U.S.C. §119(e) to U.S. Provisional Patent Application No. 62/038,152, entitled "Interactive Textiles" filed on Aug. 15, 2014, the disclosure of which is incorporated in its entirety by reference herein.

BACKGROUND

Currently, producing touch sensors can be complicated and expensive, especially if the touch sensor is intended to be light, flexible, or adaptive to various different kinds of use. Conventional touch pads, for example, are generally non-flexible and relatively costly to produce and to integrate into objects.

SUMMARY

This document describes interactive textiles. An interactive textile includes a grid of conductive thread woven into the interactive textile to form a capacitive touch sensor that is configured to detect touch-input. The interactive textile can process the touch-input to generate touch data that is useable to control various remote devices. For example, the interactive textiles may aid users in controlling volume on a stereo, pausing a movie playing on a television, or selecting a webpage on a desktop computer. Due to the flexibility of textiles, the interactive textile may be easily integrated within flexible objects, such as clothing, handbags, fabric casings, hats, and so forth. In one or more implementations, the interactive textiles may be integrated within various hard objects, such as by injection molding the interactive textile into a plastic cup, a hard casing of a smart phone, and so forth.

This summary is provided to introduce simplified concepts concerning interactive textiles, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for interactive textiles are described with reference to the following drawings. The same numbers are used throughout the drawings to reference like features and components.

DETAILED DESCRIPTION

Overview

Currently, producing touch sensors can be complicated and expensive, especially if the touch sensor is intended to be light, flexible, or adaptive to various different kinds of use. This document describes techniques using, and objects embodying, interactive textiles which are configured to sense multi-touch-input. To enable the interactive textiles to sense multi-touch-input, a grid of conductive thread is woven into the interactive textile to form a capacitive touch sensor that can detect touch-input. The interactive textile can process the touch-input to generate touch data that is useable to control various remote devices. For example, the interactive textiles may aid users in controlling volume on a stereo, pausing a movie playing on a television, or selecting a webpage on a desktop computer. Due to the flexibility of textiles, the interactive textile may be easily integrated within flexible objects, such as clothing, handbags, fabric casings, hats, and so forth. In one or more implementations, the interactive textiles may be integrated within various hard objects, such as by injection molding the interactive textile into a plastic cup, a hard casing of a smart phone, and so forth.

Example Environment

Figure 1:
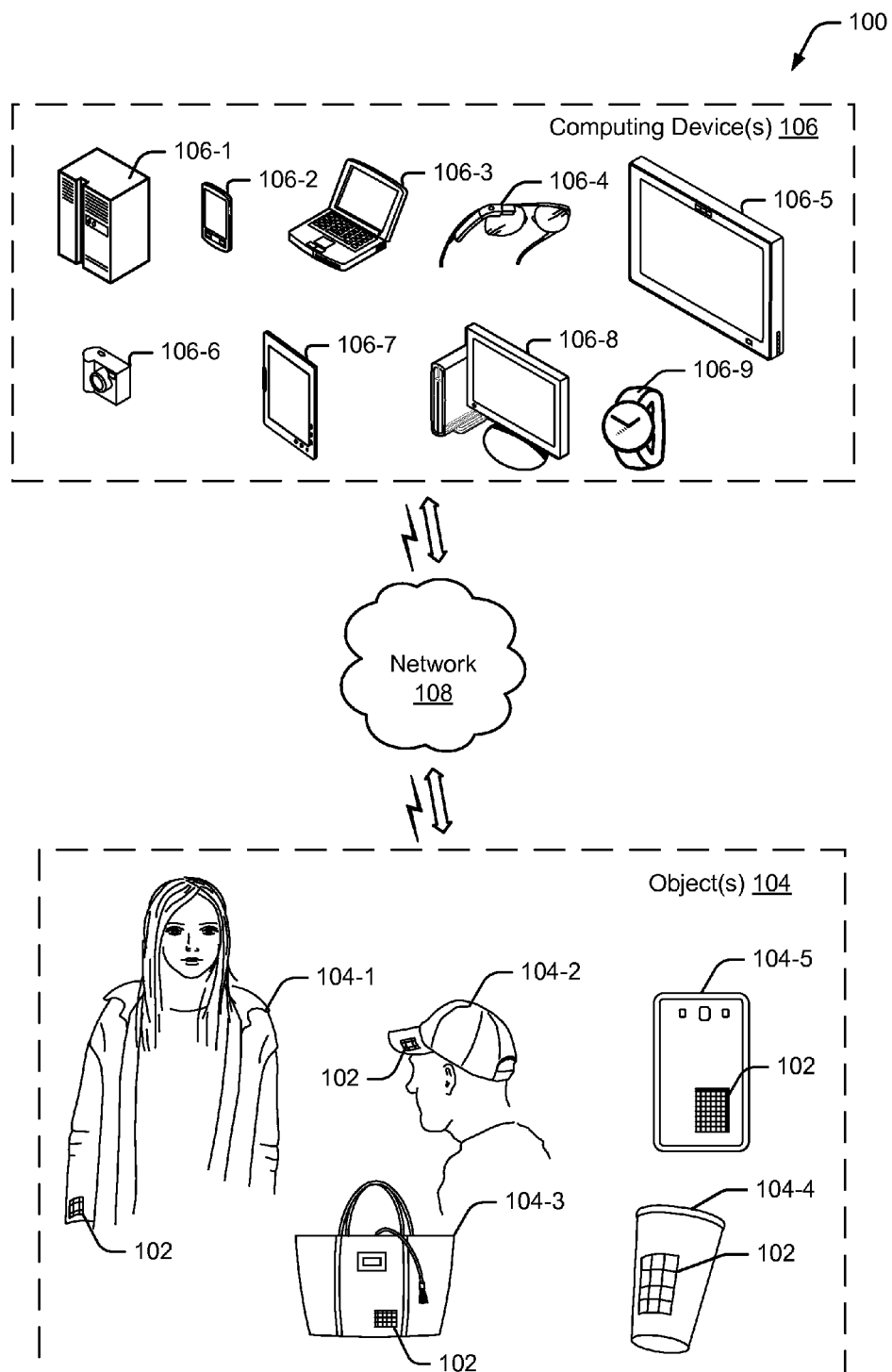
FIG. 1 is an illustration of an example environment in which techniques using, and an objects including, an interactive textile may be embodied.

FIG. 1 is an illustration of an example environment 100 in which techniques using, and objects including, an interactive textile may be embodied. Environment 100 includes an interactive textile 102, which is shown as being integrated within various objects 104. Interactive textile 102 is a textile that is configured to sense multi-touch input. As described herein, a textile corresponds to any type of flexible woven material consisting of a network of natural or artificial fibers, often referred to as thread or yarn. Textiles may be formed by weaving, knitting, crocheting, knotting, or pressing threads together.

In environment 100, objects 104 include "flexible" objects, such as a shirt 104-1, a hat 104-2, and a handbag 104-3. It is to be noted, however, that interactive textile 102 may be integrated within any type of flexible object made from fabric or a similar flexible material, such as articles of clothing, blankets, shower curtains, towels, sheets, bed spreads, or fabric casings of furniture, to name just a few. As discussed in more detail below, interactive textile 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. Interactive textile 102 may be integrated within hard objects 104 using a variety of different manufacturing processes. In one or more implementations, injection molding is used to integrate interactive textiles 102 into hard objects 104. Further discussion of injection molding interactive textiles 102 into hard objects 104 is described with regards to FIG. 7, below.

Interactive textile 102 enables a user to control object 104 that the interactive textile 102 is integrated with, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive textile 102 can interact with computing devices 106 by transmitting touch data through network 108. Computing device 106 uses the touch data to control computing device 106 or applications at computing device 106. As an example, consider that interactive textile 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on interactive textile 102 integrated within the user's shirt 104-1 to cause the volume on television 106-5 to go up or down, to cause the temperature controlled by a thermostat in the user's house to increase or decrease, or to turn on and off lights in the user's house. Note that any type of single-touch, multi-touch, or gesture recognized by conventional hard touch-input devices, such as smart phones, tablets, and the like, may be recognized by interactive textile 102.

Figure 2:
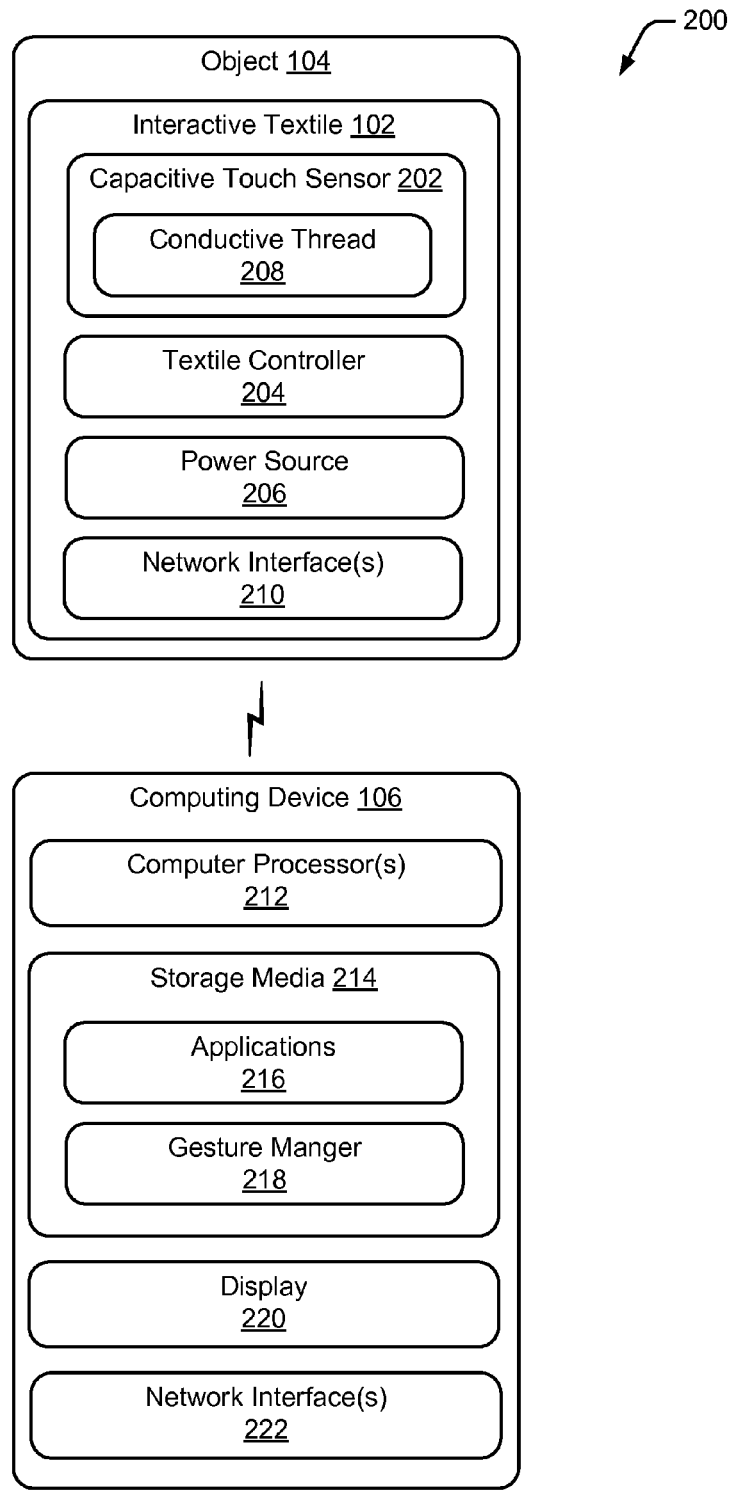
FIG. 2 illustrates an example system that includes an interactive textile and a gesture manager.

In more detail, consider FIG. 2 which illustrates an example system 200 that includes an interactive textile and a gesture manager. In system 200, interactive textile 102 is integrated in an object 104, which may be implemented as a flexible object (e.g., shirt 104-1, hat 104-2, or handbag 104-3) or a hard object (e.g., plastic cup 104-4 or smart phone casing 104-5).

Interactive textile 102 is configured to sense multi-touch-input from a user when one or more fingers of the user's hand touch interactive textile 102. Interactive textile 102 may also be configured to sense full-hand touch input from a user, such as when an entire hand of the user touches or swipes interactive textile 102. To enable this, interactive textile 102 includes a capacitive touch sensor 202, a textile controller 204, and a power source 206.

Capacitive touch sensor 202 is configured to sense touch-input when an object, such as a user's finger, hand, or a conductive stylus, approaches or makes contact with capacitive touch sensor 202. Unlike conventional hard touch pads, capacitive touch sensor 202 uses a grid of conductive thread 208 woven into interactive textile 102 to sense touch-input. Thus, capacitive touch sensor 202 does not alter the flexibility of interactive textile 102, which enables interactive textile 102 to be easily integrated within objects 104.

Power source 206 is coupled to textile controller 204 to provide power to textile controller 204, and may be implemented as a small battery. Textile controller 204 is coupled to capacitive touch sensor 202. For example, wires from the grid of conductive threads 208 may be connected to textile controller 204 using flexible PCB, creping, gluing with conductive glue, soldering, and so forth.

Textile controller 204 is implemented with circuitry that is configured to detect the location of the touch-input on the grid of conductive thread 208, as well as motion of the touch-input. When an object, such as a user's finger, touches capacitive touch sensor 202, the position of the touch can be determined by controller 204 by detecting a change in capacitance on the grid of conductive thread 208. Textile controller 204 uses the touch-input to generate touch data usable to control computing device 102. For example, the touch-input can be used to determine various gestures, such as single-finger touches (e.g., touches, taps, and holds), multi-finger touches (e.g., two-finger touches, two-finger taps, two-finger holds, and pinches), swipes (e.g., swipe up, swipe down, swipe left, swipe right), and full-hand interactions (e.g., touching the textile with a user's entire hand, pressing the textile with the user's entire hand, palm touches, and rolling, twisting, or rotating the user's hand while touching the textile). Capacitive touch sensor 202 may be implemented as a self-capacitance sensor, or a projective capacitance sensor, which is discussed in more detail below.

Object 104 may also include network interfaces 210 for communicating data, such as touch data, over wired, wireless, or optical networks to computing devices 106. By way of example and not limitation, network interfaces 210 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

In this example, computing device 106 includes one or more computer processors 212 and computer-readable storage media (storage media) 214. Storage media 214 includes applications 216 and/or an operating system (not shown) embodied as computer-readable instructions executable by computer processors 212 to provide, in some cases, functionalities described herein. Storage media 214 also includes a gesture manager 218 (described below).

Computing device 106 may also include a display 220 and network interfaces 222 for communicating data over wired, wireless, or optical networks. For example, network interfaces 222 can receive touch data sensed by interactive textile 102 from network interfaces 210 of object 104. By way of example and not limitation, network interface 222 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like.

Gesture manager 218 is capable of interacting with applications 216 and interactive textile 102 effective to aid, in some cases, control of applications 216 through touch-input received by interactive textile 102. Gesture manager 218 may be implemented at a computing device 106 that is local to object 104, or remote from object 104.

Having discussed a system in which interactive textile 102 can be implemented, now consider a more-detailed discussion of interactive textile 102.

Figure 3:
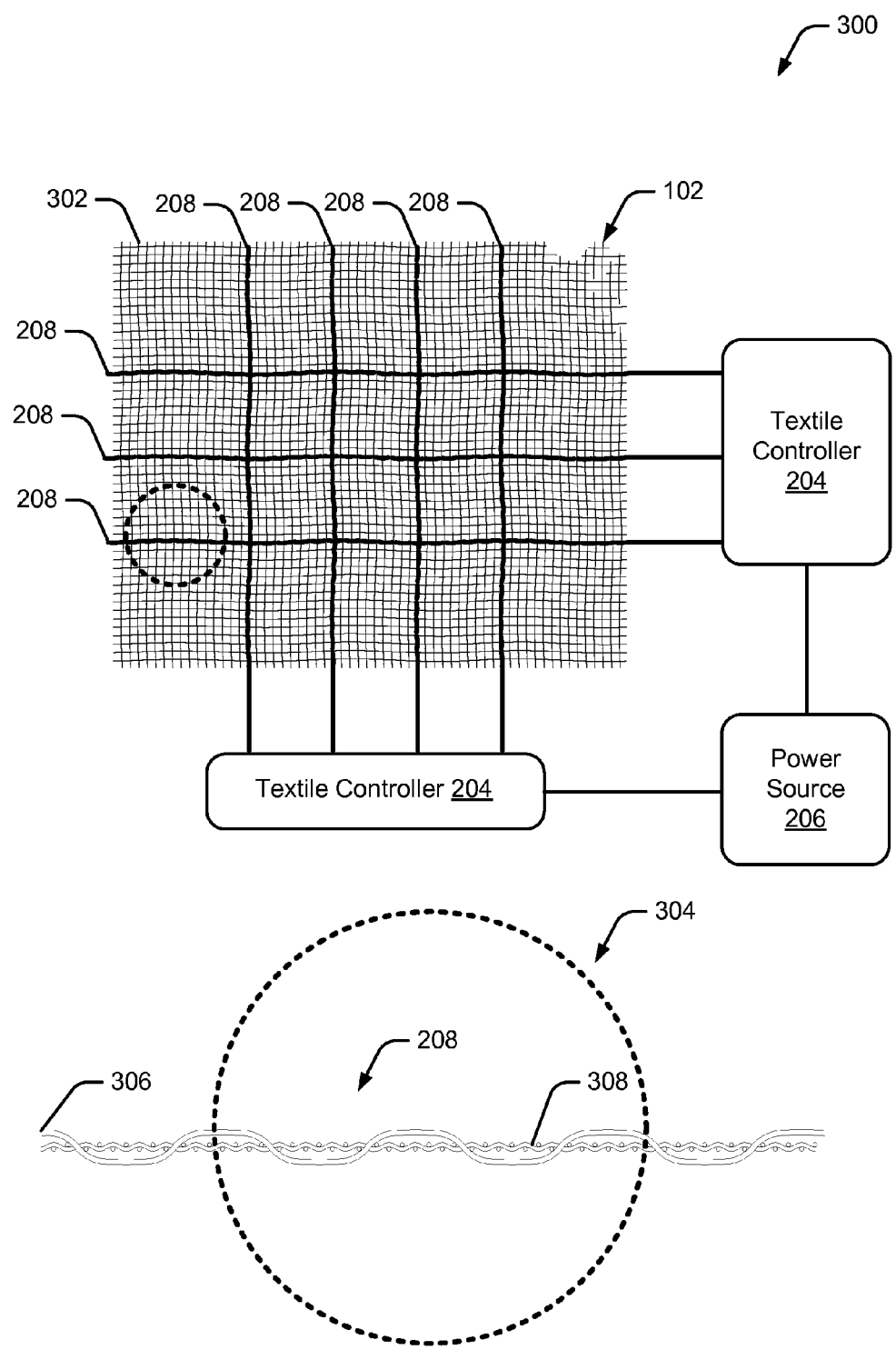
FIG. 3 illustrates an example of an interactive textile in accordance with one or more implementations.

FIG. 3 illustrates an example 300 of interactive textile 102 in accordance with one or more implementations. In this example, interactive textile 102 includes non-conductive threads 302 woven with conductive threads 208 to form interactive textile 102. Non-conductive threads 302 may correspond to any type of non-conductive thread, fiber, or fabric, such as cotton, wool, silk, nylon, polyester, and so forth.

At 304, a zoomed-in view of conductive thread 208 is illustrated. Conductive thread 208 includes a conductive wire 306 twisted with a flexible thread 308. Twisting conductive wire 306 with flexible thread 308 causes conductive thread 208 to be flexible and stretchy, which enables conductive thread 208 to be easily woven with non-conductive threads 302 to form interactive textile 102.

In one or more implementations, conductive wire 306 is a thin copper wire. It is to be noted, however, that conductive wire 306 may also be implemented using other materials, such as silver, gold, or other materials coated with a conductive polymer. Flexible thread 308 may be implemented as any type of flexible thread or fiber, such as cotton, wool, silk, nylon, polyester, and so forth.

Interactive textile 102 can be formed cheaply and efficiently, using any conventional weaving process, which involves interlacing a set of longer threads (called the warp) with a set of crossing threads (called the weft). Weaving may be implemented on a frame or machine known as a loom, of which there are a number of types. Thus, a loom can weave non-conductive threads 302 with conductive threads 208 to create interactive textile 102.

In example 300, conductive thread 208 is woven into interactive textile 102 to form a grid that includes a set of substantially parallel conductive threads 208 and a second set of substantially parallel conductive threads 208 that crosses the first set of conductive threads to form the grid. In this example, the first set of conductive threads 208 are oriented horizontally and the second set of conductive threads 208 are oriented vertically, such that the first set of conductive threads 208 are positioned substantially orthogonal to the second set of conductive threads 208. It is to be appreciated, however, that conductive threads 208 may be oriented such that crossing conductive threads 208 are not orthogonal to each other. For example, in some cases crossing conductive threads 208 may form a diamond-shaped grid. While conductive threads 208 are illustrated as being spaced out from each other in FIG. 3, it is to be noted that conductive threads 208 may be weaved very closely together. For example, in some cases two or three conductive threads may be weaved closely together in each direction.

Conductive wire 306 may be insulated to prevent direct contact between crossing conductive threads 208. To do so, conductive wire 306 may be coated with a material such as enamel or nylon. Alternately, rather than insulating conductive wire 306, interactive textile may be generated with three separate textile layers to ensure that crossing conductive threads 208 do not make direct contact with each other.

Figure 4:
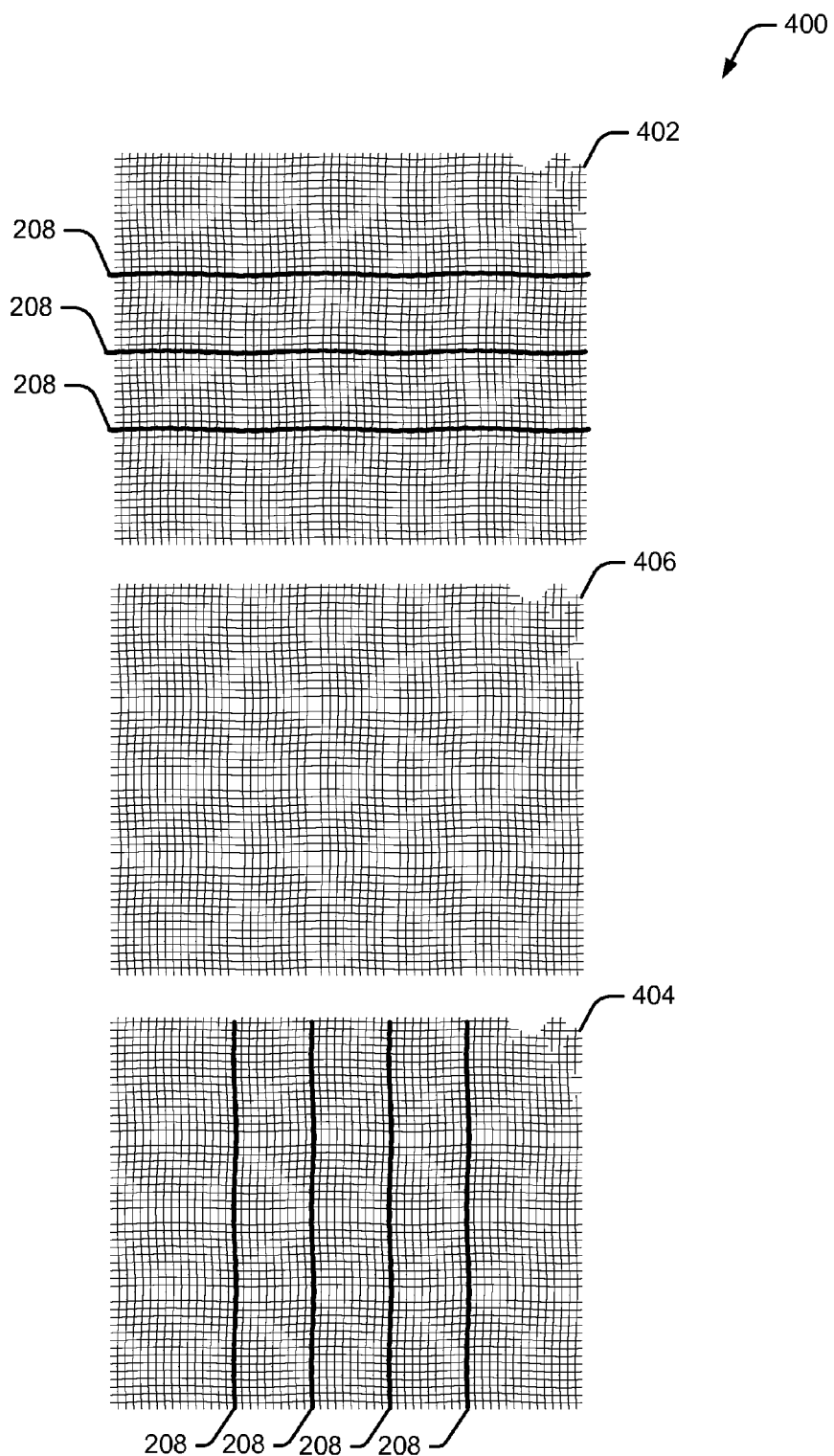
FIG. 4 illustrates an example of an interactive textile with multiple textile layers.

Consider, for example, FIG. 4 which illustrates an example 400 of an interactive textile 102 with multiple textile layers. In example 400, interactive textile 102 includes a first textile layer 402, a second textile layer 404, and a third textile layer 406. The three textile layers may be combined (e.g., by sewing or gluing the layers together) to form interactive textile 102. In this example, first textile layer 402 includes horizontal conductive threads 208, and second textile layer 404 includes vertical conductive threads 208. Third textile layer 406 does not include any conductive threads, and is positioned between first textile layer 402 and second textile layer 404 to prevent vertical conductive threads from making direct contact with horizontal conductive threads 208.

During operation, capacitive touch sensor 202 may be configured to determine positions of touch-input on the grid of conductive thread 208 using self-capacitance sensing or projective capacitive sensing.

When configured as a self-capacitance sensor, textile controller 204 charges crossing conductive threads 208 (e.g., horizontal and vertical conductive threads) by applying a control signal (e.g., a sine signal) to each conductive thread 208. When an object, such as the user's finger, touches the grid of conductive thread 208, the conductive threads 208 that are touched are grounded, which changes the capacitance (e.g., increases or decreases the capacitance) on the touched conductive threads 208.

Textile controller 204 uses the change in capacitance to identify the presence of the object. To do so, textile controller 204 detects a position of the touch-input by detecting which horizontal conductive thread 208 is touched, and which vertical conductive thread 208 is touched by detecting changes in capacitance of each respective conductive thread 208. Textile controller 204 uses the intersection of the crossing conductive threads 208 that are touched to determine the position of the touch-input on capacitive touch sensor 202. For example, textile controller 204 can determine touch data by determining the position of each touch as X,Y coordinates on the grid of conductive thread 208.

When implemented as a self-capacitance sensor, "ghosting" may occur when multi-touch input is received. Consider, for example, that a user touches the grid of conductive thread 208 with two fingers. When this occurs, textile controller 204 determines X and Y coordinates for each of the two touches. However, textile controller 204 may be unable to determine how to match each X coordinate to its corresponding Y coordinate. For example, if a first touch has the coordinates X1, Y1 and a second touch has the coordinates X4,Y4, textile controller 204 may also detect "ghost" coordinates X1, Y4 and X4,Y1.

In one or more implementations, textile controller 204 is configured to detect "areas" of touch-input corresponding to two or more touch-input points on the grid of conductive thread 208. Conductive threads 208 may be weaved closely together such that when an object touches the grid of conductive thread 208, the capacitance will be changed for multiple horizontal conductive threads 208 and/or multiple vertical conductive threads 208. For example, a single touch with a single finger may generate the coordinates X1,Y1 and X2,Y1. Thus, textile controller 204 may be configured to detect touch-input if the capacitance is changed for multiple horizontal conductive threads 208 and/or multiple vertical conductive threads 208. Note that this removes the effect of ghosting because textile controller 204 will not detect touch-input if two single-point touches are detected which are spaced apart.

Alternately, when implemented as a projective capacitance sensor, textile controller 204 charges a single set of conductive threads 208 (e.g., horizontal conductive threads 208) by applying a control signal (e.g., a sine signal) to the single set of conductive threads 208. Then, textile controller 204 senses changes in capacitance in the other set of conductive threads 208 (e.g., vertical conductive threads 208).

In this implementation, vertical conductive threads 208 are not charged and thus act as a virtual ground. However, when horizontal conductive threads 208 are charged, the horizontal conductive threads capacitively couple to vertical conductive threads 208. Thus, when an object, such as the user's finger, touches the grid of conductive thread 208, the capacitance changes on the vertical conductive threads (e.g., increases or decreases). Textile controller 204 uses the change in capacitance on vertical conductive threads 208 to identify the presence of the object. To do so, textile controller 204 detects a position of the touch-input by scanning vertical conductive threads 208 to detect changes in capacitance. Textile controller 204 determines the position of the touch-input as the intersection point between the vertical conductive thread 208 with the changed capacitance, and the horizontal conductive thread 208 on which the control signal was transmitted. For example, textile controller 204 can determine touch data by determining the position of each touch as X,Y coordinates on the grid of conductive thread 208.

Whether implemented as a self-capacitance sensor or a projective capacitance sensor, capacitive sensor 208 is configured to communicate the touch data to gesture manager 218 to enable gesture manager 218 to determine gestures based on the touch data, which can be used to control object 104, computing device 106, or applications 216 at computing device 106.

Figure 5A:
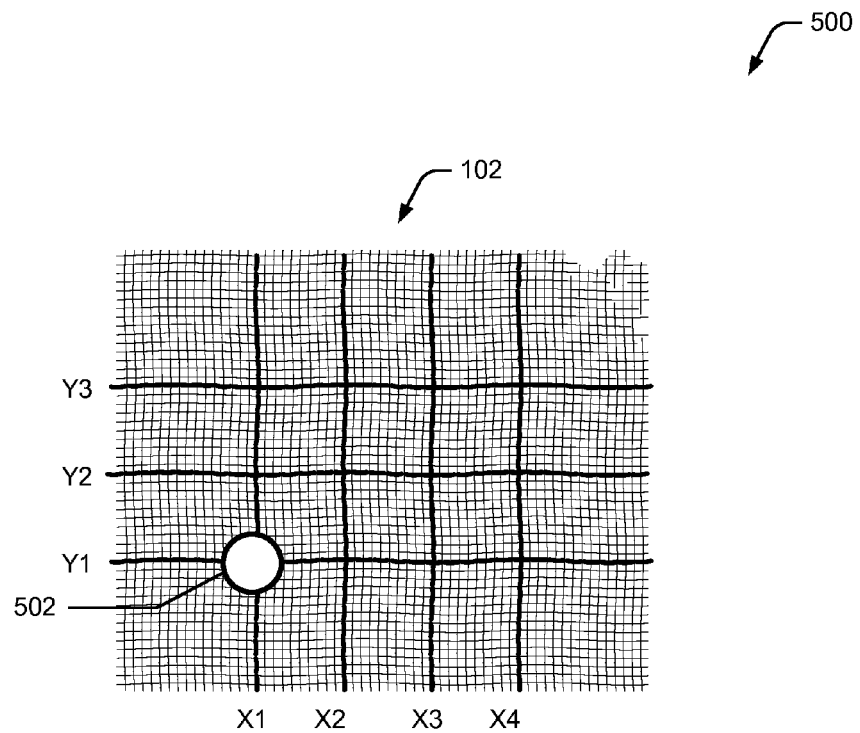
FIG. 5A illustrates an example of generating a control based on touch-input corresponding to a single-finger touch.
Figure 5A:
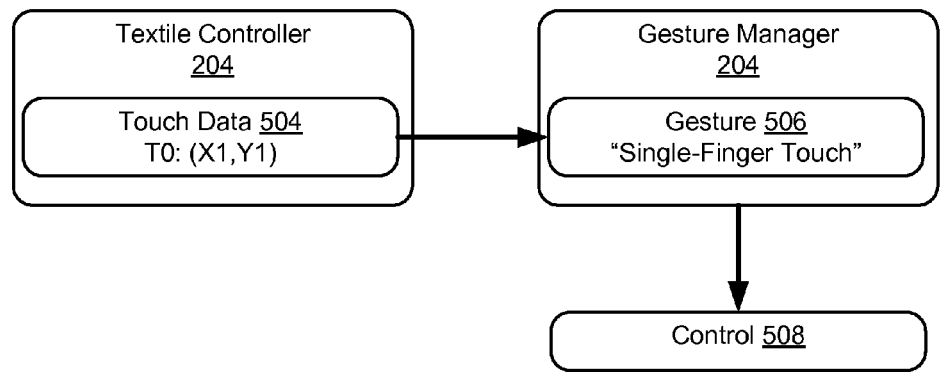

FIG. 5A illustrates an example 500 of generating a control based on touch-input corresponding to a single-finger touch. In example 500, horizontal conductive threads 208 and vertical conductive threads 208 of capacitive touch sensor 204 form an X,Y grid. The X-axis in this grid is labeled X1, X2, X3, and X4, and the Y-axis is labeled Y1, Y2, and Y3. As described above, textile controller 204 can determine the location of each touch on this X,Y grid using self-capacitance sensing or projective capacitance sensing.

In this example, touch-input 502 is received when a user touches interactive textile 102. When touch-input 502 is received, textile controller 204 determines the position and time of touch-input 502 on the grid of conductive thread 208, and generates touch data 504 which includes the position of the touch: "X1,Y1", and a time of the touch: T0. Then, touch data 504 is communicated to gesture manager 218 at computing device 106 (e.g., over network 108 via network interface 210).

Gesture manager 218 receives touch data 504, and generates a gesture 506 corresponding to touch data 504. In this example, gesture manager 218 determines gesture 506 to be "single-finger touch" because the touch data corresponds to a single touch-input point (X1,Y1) at a single time period (T0). Gesture manager 218 may then initiate a control 508 based on the single-finger touch gesture 506 to control object 104, computing device 106, or an application 216 at computing device 106. A single-finger touch gesture, for example, may be used to control computing device 106 to power-on or power-off, to control an application 216 to open or close, to control lights in the user's house to turn on or off, and so on.

Figure 5B:
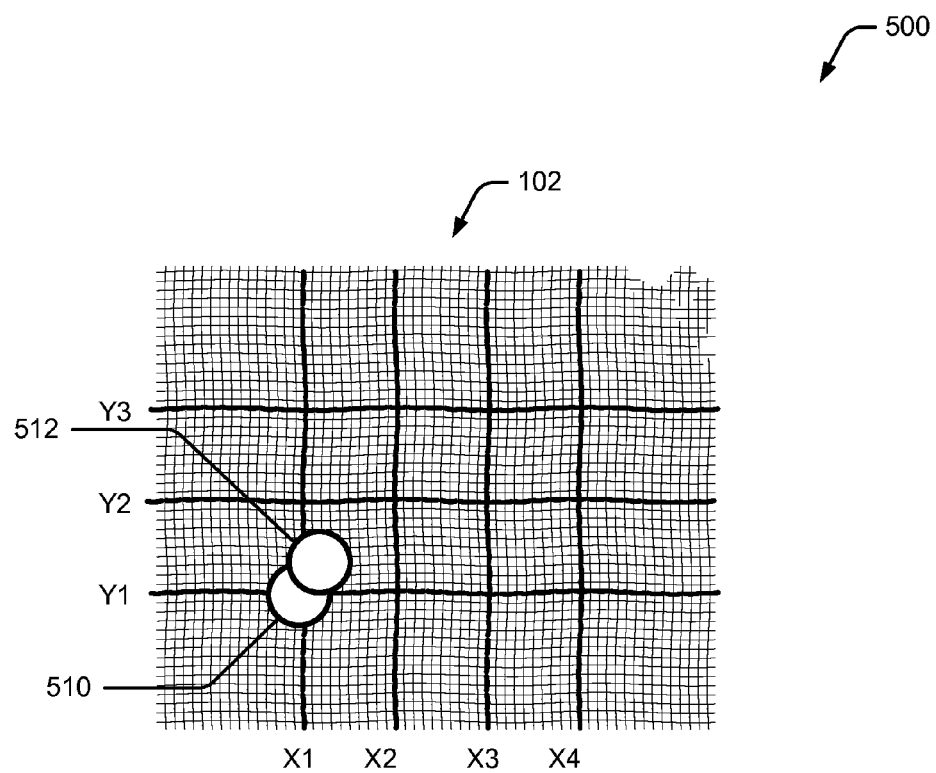
FIG. 5B illustrates an example of generating a control based on touch-input corresponding to a double-tap.
Figure 5B:
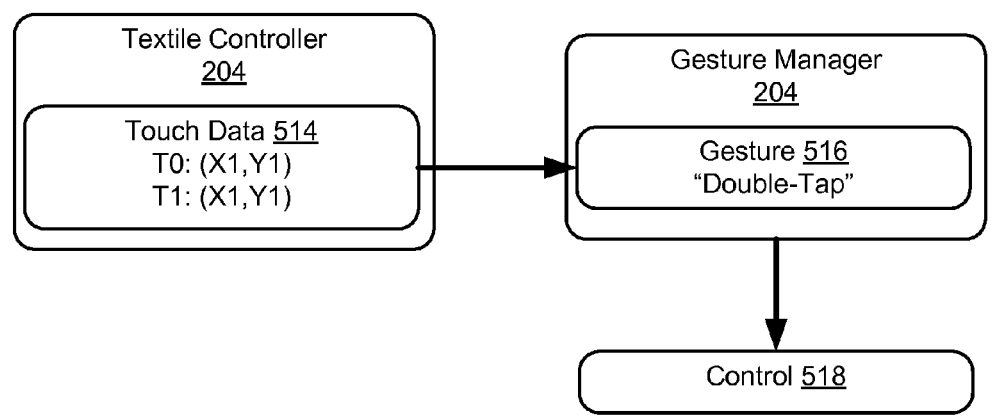

Next, consider FIG. 5B which illustrates an example 500 of generating a control based on touch-input corresponding to a double-tap. In this example, touch-input 510 and 512 is received when a user double taps interactive textile 102, such as by quickly tapping interactive textile 102. When touch-input 510 and 512 is received, textile controller 204 determines the positions and time of the touch-input on the grid of conductive thread 208, and generates touch data 514 which includes the position of the first touch: "X1,Y1", and a time of the first touch: T0. The touch data 514 further includes the position of the second touch: "X1,Y1", and the time of the second touch: T1. Then, touch data 514 is communicated to gesture manager 218 at computing device 106 (e.g., over network 108 via network interface 210).

Gesture manager 218 receives touch data 514, and generates a gesture 516 corresponding to the touch data. In this example, gesture manager 218 determines gesture 516 as a "double-tap" based on two touches being received at substantially the same position at different times. Gesture manager 218 may then initiate a control 518 based on the double-tap touch gesture 516 to control object 104, computing device 106, or an application 216 at computing device 106. A double-tap gesture, for example, may be used to control computing device 106 to power-on an integrated camera, start the play of music via a music application 216, lock the user's house, and so on.

Figure 5C:
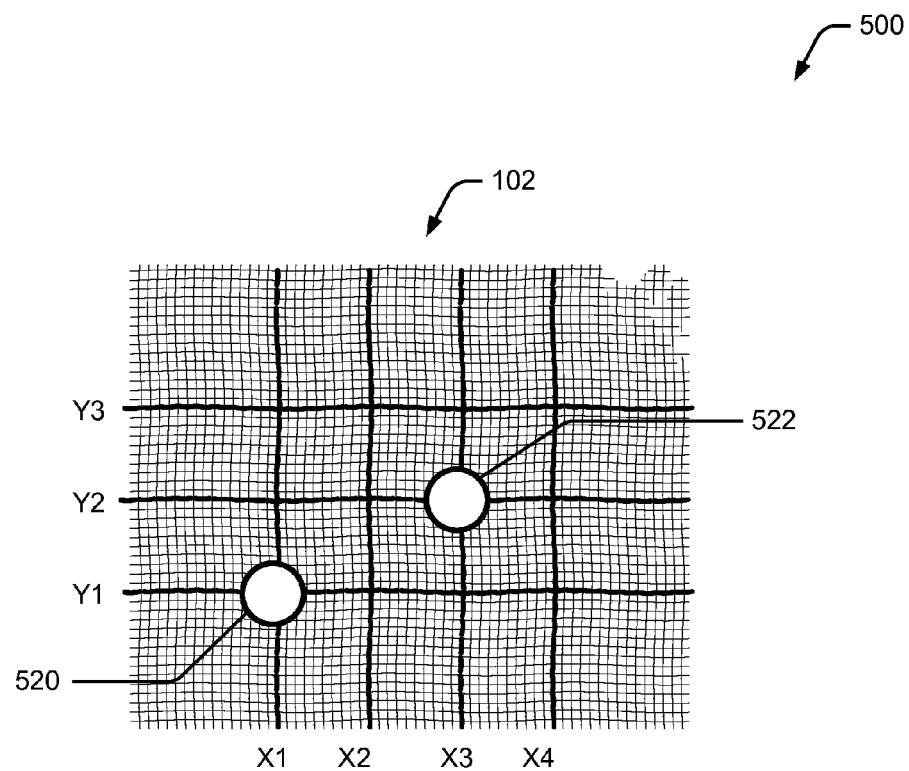
FIG. 5C illustrates an example of generating a control based on touch-input corresponding to a two-finger touch.
Figure 5C:
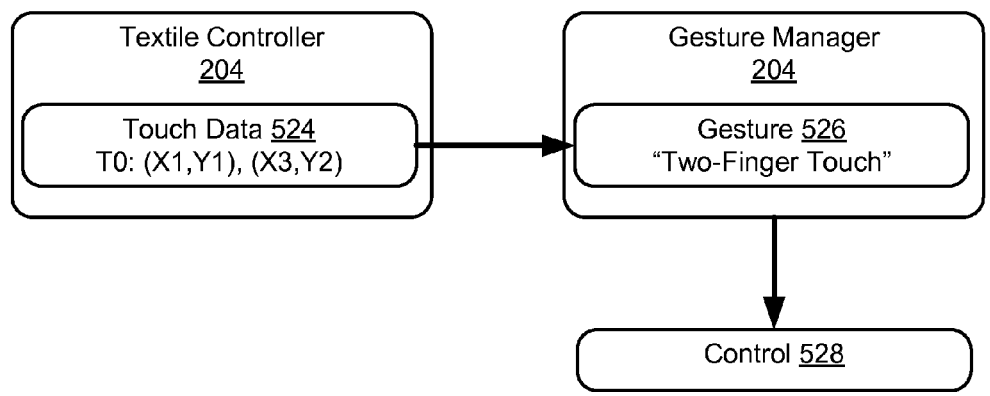

Next, consider FIG. 5C which illustrates an example 500 of generating a control based on touch-input corresponding to a two-finger touch. In this example, touch-input 520 and 522 is received when a user touches interactive textile 102 with two fingers at substantially the same time. When touch-input 520 and 522 is received, textile controller 204 determines the positions and time of the touch-input on the grid of conductive thread 208, and generates touch data 524 which includes the position of the touch by a first finger: "X1,Y1", at a time T0. Touch data 524 further includes the position of the touch by a second finger: "X3,Y2", at the same time T0. Then, touch data 524 is communicated to gesture manager 218 at computing device 106 (e.g., over network 108 via network interface 210).

Gesture manager 218 receives touch data 524, and generates a gesture 526 corresponding to the touch data. In this case, gesture manager 218 determines gesture 526 as a "two-finger touch" based on two touches being received in different positions at substantially the same time. Gesture manager may then initiate a control 528 based on two-finger touch gesture 526 to control object 104, computing device 106, or an application 216 at computing device 106. A two-finger touch gesture, for example, may be used to control computing device 106 to take a photo using an integrated camera, pause the playback of music via a music application 216, turn on the security system at the user's house and so on.

Figure 5D:
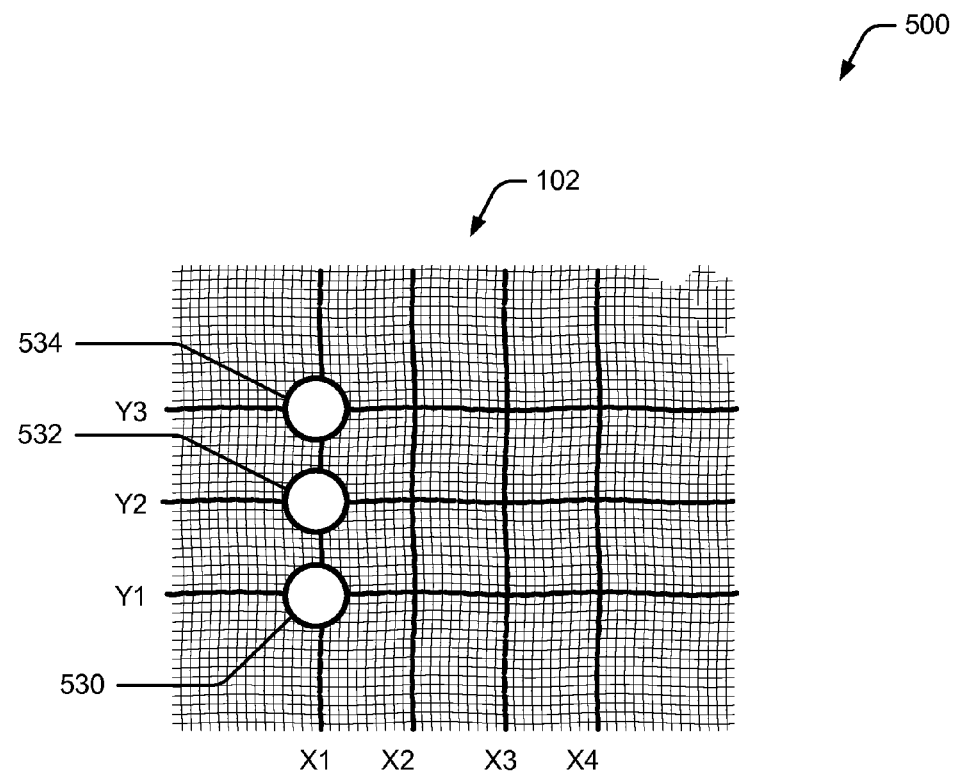
FIG. 5D illustrates an example of generating a control based on touch-input corresponding to a swipe up.
Figure 5D:
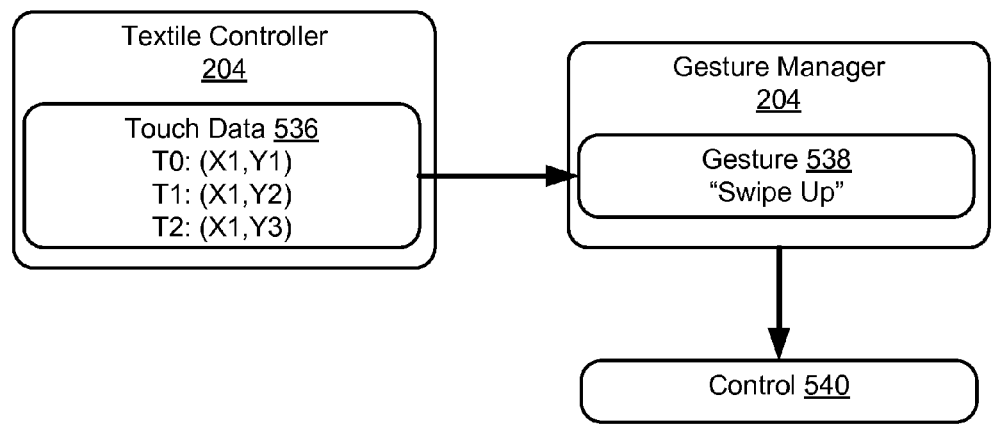

Next, consider FIG. 5D which illustrates an example 500 of generating a control based on touch-input corresponding to a swipe up. In this example, touch-input 530, 532, and 534 is received when a user swipes upwards on interactive textile 102. When touch-input 530, 532, and 534 is received, textile controller 204 determines the positions and time of the touch-input on the grid of conductive thread 208, and generates touch data 536 corresponding to the position of a first touch as "X1,Y1" at a time T0, a position of a second touch as "X1,Y2" at a time T1, and a position of a third touch as "X1,Y3" at a time T2. Then, touch data 536 is communicated to gesture manager 218 at computing device 106 (e.g., over network 108 via network interface 210).

Gesture manager 218 receives touch data 536, and generates a gesture 538 corresponding to the touch data. In this case, the gesture manager 218 determines gesture 538 as a "swipe up" based on three touches being received in positions moving upwards on the grid of conductive thread 208. Gesture manager may then initiate a control 540 based on the swipe up gesture 538 to control object 104, computing device 106, or an application 216 at computing device 106. A swipe up gesture, for example, may be used to control computing device 106 to accept a phone call, increase the volume of music being played by a music application 216, or turn on lights in the user's house.

While FIGS. 5A-5D describe, generally, various types of touch-input recognizable by interactive textile 102, it is to be noted that virtually any type of touch-input may be detected by interactive textile 102. For example, any type of single or multi-touch taps, touches, holds, swipes, and so forth, that can be detected by conventional touch-enabled smart phones and tablet devices, may also be detected by interactive textile 102.

Having discussed interactive textiles 102, and how interactive textiles 102 detect touch-input, consider now a discussion of how interactive textiles 102 may be easily integrated within flexible objects 104, such as clothing, handbags, fabric casings, hats, and so forth.

Figure 6:
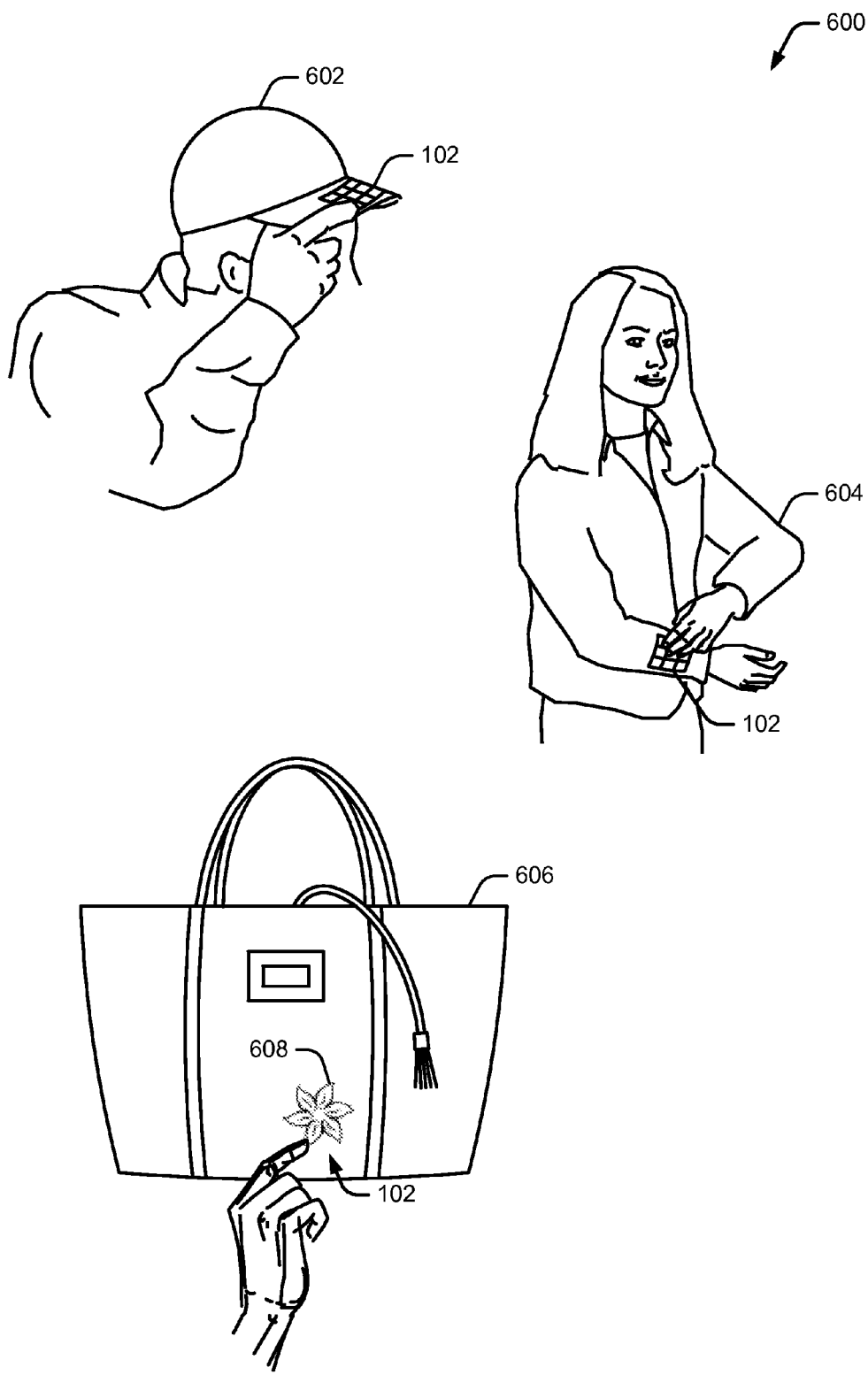
FIG. 6 illustrates various examples of interactive textiles integrated within flexible objects.

FIG. 6 illustrates various examples 600 of interactive textiles integrated within flexible objects. Examples 600 depict interactive textile 102 integrated in a hat 602, a shirt 604, and a handbag 606.

Interactive textile 102 is integrated within the bill of hat 602 to enable the user to control various computing devices 106 by touching the bill of the user's hat. For example, the user may be able to tap the bill of hat 602 with a single finger at the position of interactive textile 102, to answer an incoming call to the user's smart phone, and to touch and hold the bill of hat 602 with two fingers to end the call.

Interactive textile 102 is integrated within the sleeve of shirt 604 to enable the user to control various computing devices 106 by touching the sleeve of the user's shirt. For example, the user may be able to swipe to the left or to the right on the sleeve of shirt 604 at the position of interactive textile 102 to play a previous or next song, respectively, on a stereo system of the user's house.

In examples 602 and 604, the grid of conductive thread 208 is depicted as being visible on the bill of the hat 602 and on the sleeve of shirt 604. It is to be noted, however, that interactive textile 102 may be manufactured to be the same texture and color as object 104 so that interactive textile 102 is not noticeable on the object.

In some implementations, a patch of interactive textile 102 may be integrated within flexible objects 104 by sewing or gluing the patch of interactive textile 102 to flexible object 104. For example, a patch of interactive textile 102 may be attached to the bill of hat 602, or to the sleeve of shirt 604 by sewing or gluing the patch of interactive textile 102, which includes the grid of conductive thread 208, directly onto the bill of hat 602 or the sleeve of shirt 604, respectively. Interactive textile 102 may then be coupled to textile controller 204 and power source 206, as described above, to enable interactive textile 102 to sense touch-input.

In other implementations, conductive thread 208 of interactive textile 102 may be woven into flexible object 104 during the manufacturing of flexible object 104. For example, conductive thread 208 of interactive textile 102 may be woven with non-conductive threads on the bill of hat 602 or the sleeve of a shirt 604 during the manufacturing of hat 602 or shirt 604, respectively.

In one or more implementations, interactive textile 102 may be integrated with an image on flexible object 104. Different areas of the image may then be mapped to different areas of capacitive touch sensor 202 to enable a user to initiate different controls for computing device 106, or application 216 at computing device 106, by touching the different areas of the image. In FIG. 6, for example, interactive textile 102 is weaved with an image of a flower 608 onto handbag 606 using a weaving process such as jacquard weaving. The image of flower 608 may provide visual guidance to the user such that the user knows where to touch the handbag in order to initiate various controls. For example, one petal of flower 608 could be used to turn on and off the user's smart phone, another petal of flower 608 could be used to cause the user's smart phone to ring to enable the user to find the smart phone when it is lost, and another petal of flower 608 could be mapped to the user's car to enable the user to lock and unlock the car.

Similarly, in one or more implementations interactive textile 102 may be integrated with a three-dimensional object on flexible object 104. Different areas of the three-dimensional object may be mapped to different areas of capacitive touch sensor 202 to enable a user to initiate different controls for computing device 106, or application 216 at computing device 106, by touching the different areas of the three-dimensional object. For example, bumps or ridges can be created using a material such as velvet or corduroy and woven with interactive textile 102 onto object 104. In this way, the three-dimensional objects may provide visual and tactile guidance to the user to enable the user to initiate specific controls. A patch of interactive textile 102 may be weaved to form a variety of different 3D geometric shapes other than a square, such as a circle, a triangle, and so forth.

Having discussed ways in which interactive textile 102 may be easily integrated within flexible objects 104, consider now a discussion of ways in which interactive textiles 102 may be easily integrated within hard objects 104, such as plastic cups, hard smart phone casings, chairs, and so forth.

In various implementations, interactive textile 102 may be integrated within a hard object 104 using injection molding. Injection molding is a common process used to manufacture parts, and is ideal for producing high volumes of the same object. For example, injection molding may be used to create many things such as wire spools, packaging, bottle caps, automotive dashboards, pocket combs, some musical instruments (and parts of them), one-piece chairs and small tables, storage containers, mechanical parts (including gears), and most other plastic products available today.

In order to create an object 104 with an integrated interactive textile 102 using injection molding, a patch of interactive textile 102 is placed into a mold of an injection molding machine A heated material, such as plastic, metal, or glass, is then injected into the mold where it cools and hardens to the configuration of the mold. After the heated material cools, a hard object in the shape of the mold that includes interactive textile 102 is removed from the mold.

Figure 7:
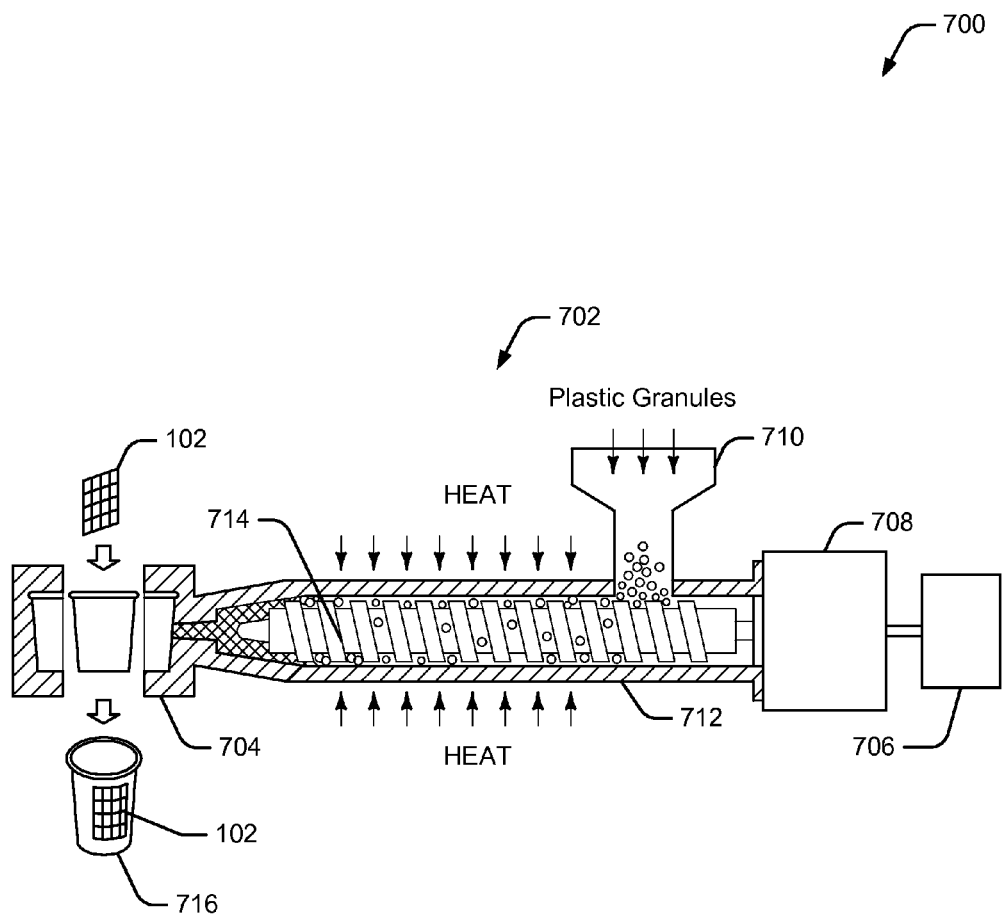
FIG. 7 is an illustration of an example environment for injection molding an interactive textile into a hard object.

Consider, for example, FIG. 7 which illustrates an example environment 700 for injection molding an interactive textile into a hard object. Environment 700 includes an injection molding machine 702, which includes a mold 704, an injection molding controller 706, a motor 708, a hopper 710, a barrel 712, and a screw thread 714. Mold 704 can be designed to match the desired shape of any type of hard object 104. In this example, mold 704 is a configured to generate a plastic cup.

In order to injection mold interactive textile 102 into a hard object 104, injection molding controller 706 causes injection molding machine 702 to place interactive textile 102 into mold 704. Interactive textile 102 can be positioned within mold 704 such that interactive textile 102 will cover the outer surface of the hard object. For example, interactive textile 102 may be placed into an outer contour of mold 704, such that interactive textile 102 will visibly cover the outer surface of the manufactured object. Note that because interactive textile 102 is flexible, it can conform to the contour of a three-dimensional outer surface, such as the surface of a plastic cup, car parts, a steering wheel, plastic chairs, and so on.

Alternately, interactive textile 102 may be positioned within mold 704 such that interactive textile 102 will be inside the hard object. For example, interactive textile 102 may be placed within an inner contour of mold 704 such that interactive textile 102 is not visible on the manufactured object. In these cases, interactive textile 102 will still be able to detect touch-input to the hard object.

Further, in order to enable interactive textile 102 to be connected to textile controller 204 and power source 206, interactive textile 102 may be positioned in the mold such that wire connections to interactive textile 102 protrude from the hard object.

Next, injection molding controller 706 causes a material, such as plastic granules, to be poured into hopper 710, which stores the material until it is needed. A heater (not pictured) is controlled to heat barrel 712 to a predetermined high temperature. When the high temperature is reached, injection molding controller 706 causes motor 708 to begin turning screw thread 714. Screw thread 714 pushes the plastic granules along the heated section of barrel 712 which melts the plastic granules into liquid form.

Screw thread 714 forces the hot plastic liquid into mold 704, where it cools and hardens into the shape of mold 704 and is permanently attached to interactive textile 102. When the plastic has cooled and hardened, injection molding controller 706 causes mold 704 to open, and a hard object 716 with interactive textile 102 is removed from the mold. In this case, hard object 716 is a plastic cup in the shape of mold 704. Note that interactive textile 102 wraps around the curved three-dimensional outer surface of hard object 716. After hard object 716 is removed from mold 704, textile controller 204 and power source 206 may be easily connected to interactive textile 102 via the wire connections which protrude from hard object 716.

Figure 8:
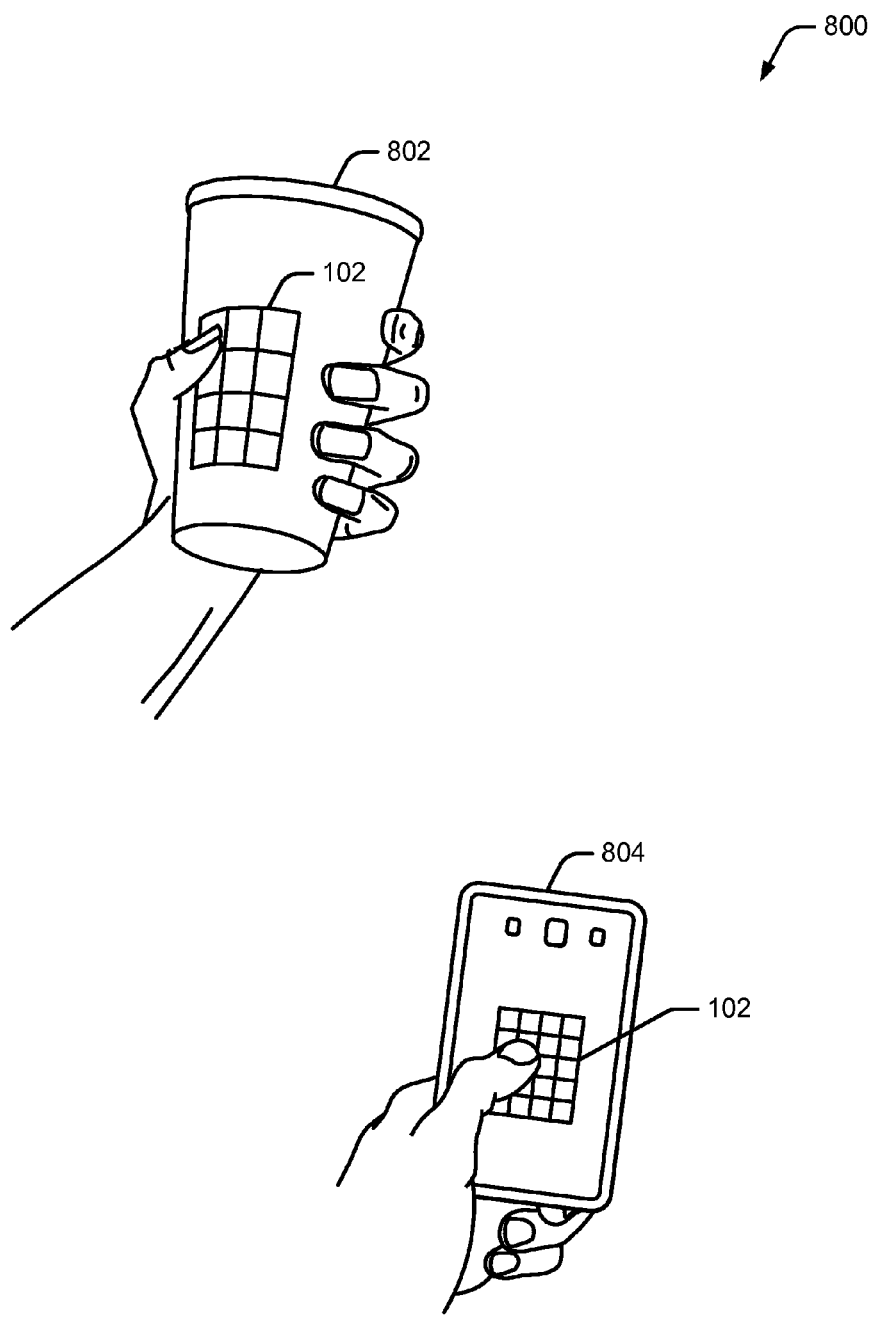
FIG. 8 illustrates various examples of interactive textiles integrated within hard objects.

Consider now, FIG. 8 which illustrates various examples of interactive textiles integrated within hard objects. Examples 800 depict interactive textile 102 integrated within a plastic cup 802 and within a smart phone casing 804.

Interactive textile 102 is integrated within plastic cup 802 to enable the user to control various computing devices 106 by touching the side of plastic cup 802. For example, the user may be able to touch the side of plastic cup 802 with the user's thumb to track the number of glasses of water the user drinks, or to control various appliances in the user's kitchen.

Interactive textile 102 is integrated within smart phone casing 804 to enable the user to control the smart phone which the casing covers, or to control various other computing devices, by touching the back of smart phone casing 804. For example, the user may be able to perform a specific gesture on the back of smart phone casing 804 to unlock the user's smart phone.

In each of these examples, interactive textile 102 is depicted as covering a portion of the outer surface of the hard object. In some cases, however, interactive textile 102 may completely cover the outer surface of the hard object. Note that by covering the outer surface, interactive textile 102 may provide various attributes to the hard object, such as enhancing the appearance of the hard object, providing desirable contact surfaces (e.g. for gripping or general feel), enabling design variability (e.g., through the use of different textiles), and so forth.

Example Methods

Figure 9:
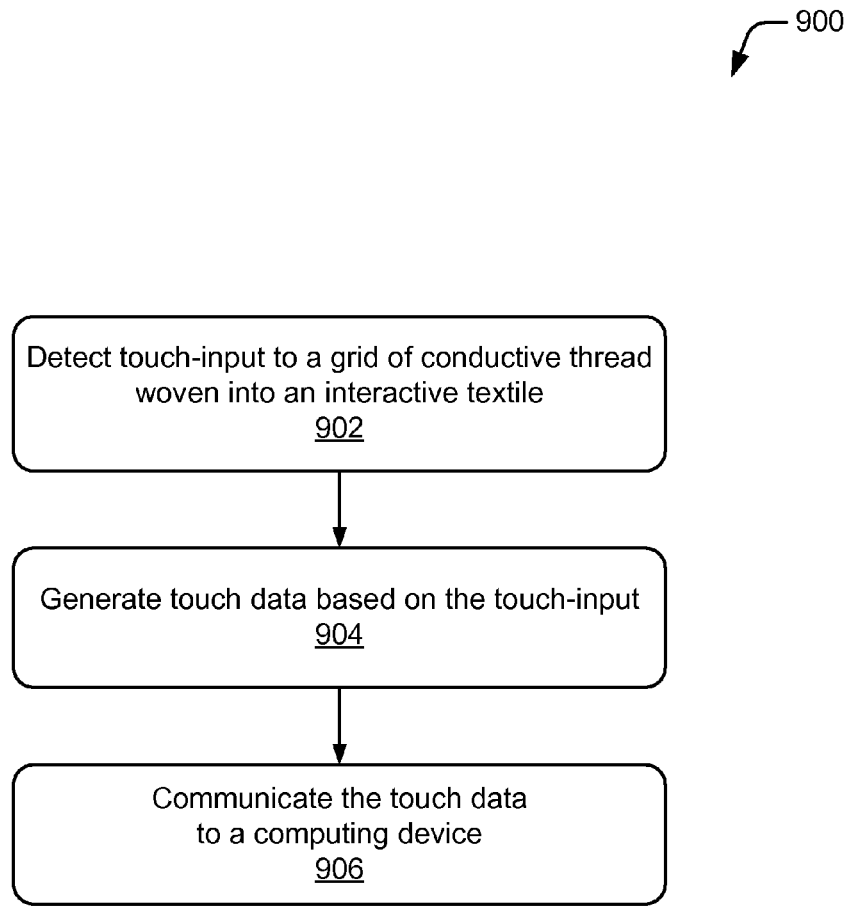
FIG. 9 illustrates an example method of generating touch data using an interactive textile.
Figure 10:
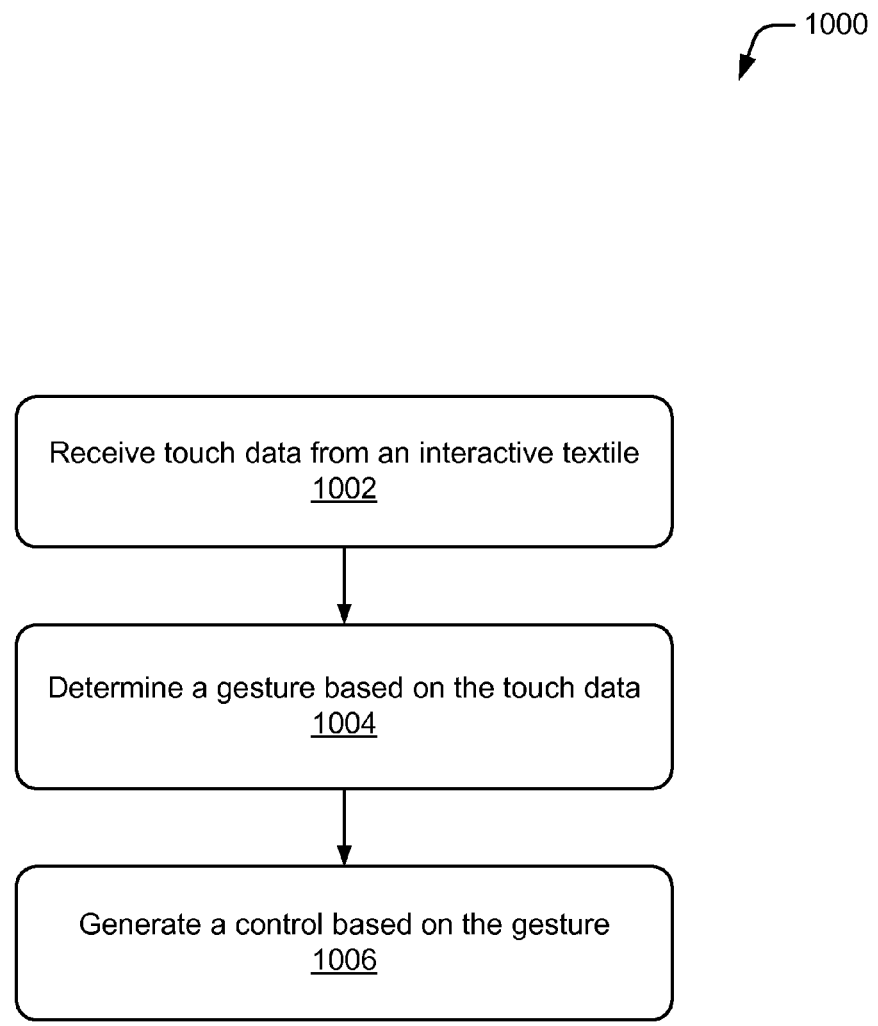
FIG. 10 illustrates an example method of determining gestures usable to control a computing device or applications at the computing device based on touch data received from an interactive textile.

FIGS. 9 and 10 illustrate an example method 900 (FIG. 9) of generating touch data using an interactive textile, and an example method 1000 (FIG. 10) of determining gestures usable to control a computing device or applications at the computing device based on touch data received from an interactive textile. These methods and other methods herein are shown as sets of blocks that specify operations performed but are not necessarily limited to the order or combinations shown for performing the operations by the respective blocks. In portions of the following discussion reference may be made to environment 100 of FIG. 1 and system 200 of FIG. 2, reference to which is made for example only. The techniques are not limited to performance by one entity or multiple entities operating on one device.

At 902, touch-input to a grid of conductive thread woven into an interactive textile is detected. For example, textile controller 204 (FIG. 2) detects touch-input to the grid of conductive thread 208 woven into interactive textile 102 (FIG. 1) when an object, such as a user's finger, touches interactive textile 102. Interactive textile 102 may be integrated within a flexible object, such as shirt 104-1, hat 104-2, or handbag 104-3. Alternately, interactive textile 102 may be integrated with a hard object, such as plastic cup 104-4 or smart phone casing 104-5.

At 904, touch data is generated based on the touch-input. For example, textile controller 204 generates touch data based on the touch-input. The touch data may include a position of the touch-input on the grid of conductive thread 208.

As described throughout, the grid of conductive thread 208 may include horizontal conductive threads 208 and vertical conductive threads 208 positioned substantially orthogonal to the horizontal conductive threads. To detect the position of the touch-input, textile controller 204 can use self-capacitance sensing or projective capacitance sensing.

At 906, the touch data is communicated to a computing device to control the computing device or one or more applications at the computing device. For example, network interface 210 at object 104 communicates the touch data generated by textile controller 204 to gesture manager 218 implemented at computing device 106. Gesture manager 218 and computing device 106 may be implemented at object 104, in which case interface may communicate the touch data to gesture manager 218 via a wired connection. Alternately, gesture manager 218 and computing device 106 may be implemented remote from interactive textile 102, in which case network interface 210 may communicate the touch data to gesture manager 218 via network 108.

FIG. 10 illustrates an example method 1000 of determining gestures usable to control a computing device or applications at the computing device based on touch data received from an interactive textile.

At 1002, touch data is received from an interactive textile. For example, network interface 222 (FIG. 2) at computing device 106 receives touch data from network interface 210 at interactive textile 102 that is communicated to gesture manager 218 at step 906 of FIG. 9.

At 1004, a gesture is determined based on the touch data. For example, gesture manager 218 determines a gesture based on the touch data, such as single-finger touch gesture 506, a double-tap gesture 516, a two-finger touch gesture 526, a swipe gesture 538, and so forth.

At 1006, a control is generated based on the gesture. For example, gesture manager 218 generates a control based on the gesture to control an object 104, computing device 106, or an application 216 at computing device 106. For example, a swipe up gesture may be used to increase the volume on a television, turn on lights in the user's house, open the automatic garage door of the user's house, and so on.

Figure 11:
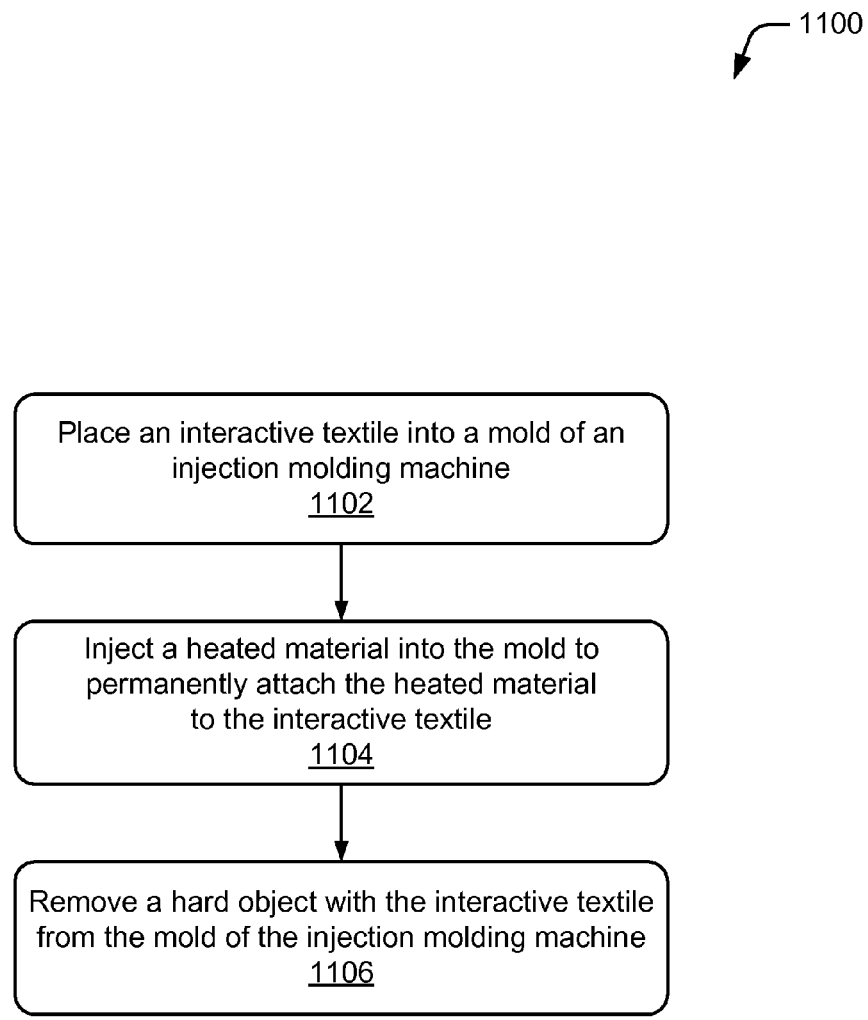
FIG. 11 illustrates an example method of injection molding an interactive textile into a hard object.

FIG. 11 illustrates an example method 1100 of injection molding an interactive textile into a hard object. In portions of the following discussion reference may be made to environment 700 of FIG. 7, reference to which is made for example only. The techniques are not limited to performance by one entity or multiple entities operating on one device.

At 1102, an interactive textile is placed into a mold of an injection molding machine. For example, interactive textile 102 is placed in mold 704 of injection molding machine 702. As described throughout, interaction textile 102 includes a grid of conductive thread 208 woven into the interactive textile to form a capacitive touch sensor 202.

In some cases, interactive textile 102 is positioned in an outer contour of the mold to cause the interactive textile to visibly cover at least a portion of an outer surface of the hard object manufactured by the injection molding machine. Alternately, interactive textile 102 may be placed in an inner contour of the mold to cause the interactive textile to be positioned inside the hard object such that the interactive textile is not visible.

At 1104, a heated material is injected into the mold to permanently attach the heated material to the interactive textile. For example, plastic granules are heated in barrel 712 of injection molding machine 702, and screw thread 714 pushes the heated plastic into mold 704. When the plastic cools and hardens, the plastic will be permanently attached to interactive textile 102.

At 1106, a hard object with the interactive textile is removed from the mold of the injection molding machine. For example, a plastic cup 716 with interactive textile 102 is removed from mold 704 of injection molding machine 702 after the plastic has cooled and hardened.

The preceding discussion describes methods relating to interactive textiles. Aspects of these methods may be implemented in hardware (e.g., fixed logic circuitry), firmware, software, manual processing, or any combination thereof. These techniques may be embodied on one or more of the entities shown in FIGS. 1-8 and 12 (computing system 1200 is described in FIG. 12 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 12:
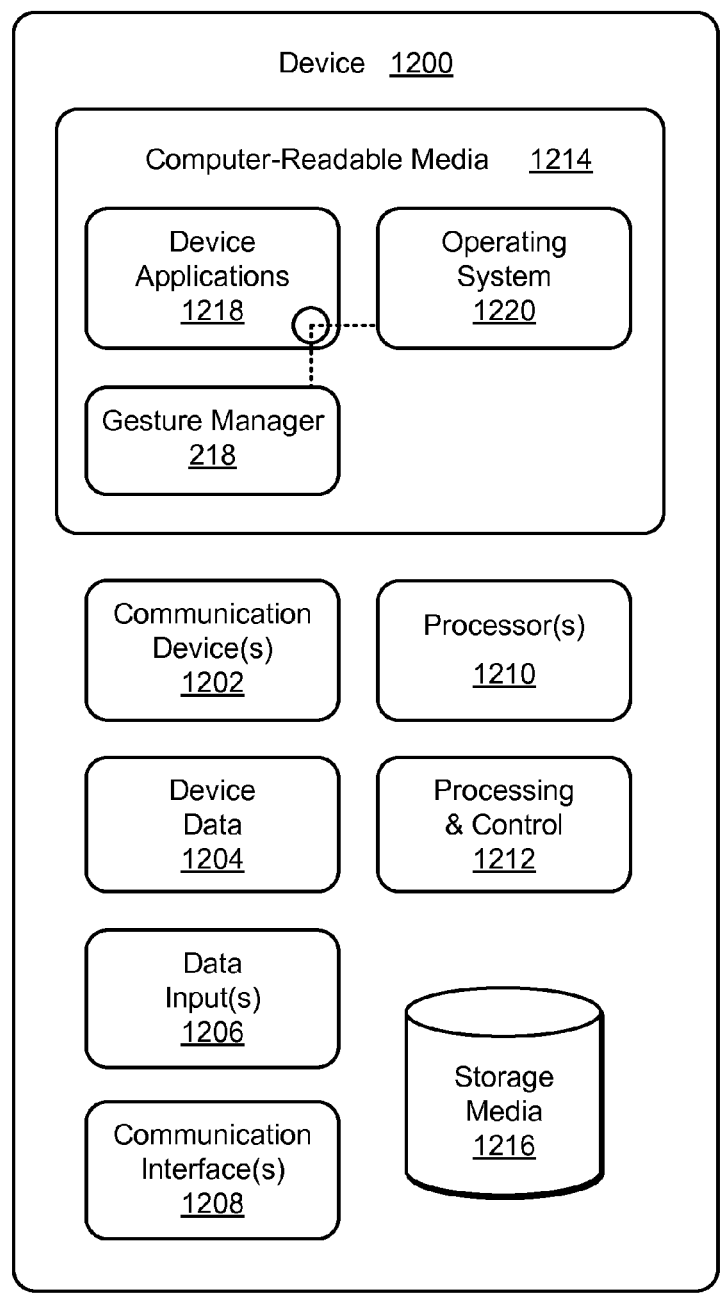
FIG. 12 illustrates various components of an example computing system 1200 that can be implemented as any type of client, server, and/or computing device as described with reference to the previous FIGS. 1-11 to implement interactive textiles.

FIG. 12 illustrates various components of an example computing system 1200 that can be implemented as any type of client, server, and/or computing device as described with reference to the previous FIGS. 1-11 to implement interactive textiles. In embodiments, computing system 1200 can be implemented as one or a combination of a wired and/or wireless wearable device, System-on-Chip (SoC), and/or as another type of device or portion thereof. Computing system 1200 may also be associated with a user (e.g., a person) and/or an entity that operates the device such that a device describes logical devices that include users, software, firmware, and/or a combination of devices.

Computing system 1200 includes communication devices 1202 that enable wired and/or wireless communication of device data 1204 (e.g., received data, data that is being received, data scheduled for broadcast, data packets of the data, etc.). Device data 1204 or other device content can include configuration settings of the device, media content stored on the device, and/or information associated with a user of the device. Media content stored on computing system 1200 can include any type of audio, video, and/or image data. Computing system 1200 includes one or more data inputs 1206 via which any type of data, media content, and/or inputs can be received, such as human utterances, touch data generated by interactive textile 102, user-selectable inputs (explicit or implicit), messages, music, television media content, recorded video content, and any other type of audio, video, and/or image data received from any content and/or data source.

Computing system 1200 also includes communication interfaces 1208, which can be implemented as any one or more of a serial and/or parallel interface, a wireless interface, any type of network interface, a modem, and as any other type of communication interface. Communication interfaces 1208 provide a connection and/or communication links between computing system 1200 and a communication network by which other electronic, computing, and communication devices communicate data with computing system 1200.

Computing system 1200 includes one or more processors 1210 (e.g., any of microprocessors, controllers, and the like), which process various computer-executable instructions to control the operation of computing system 1200 and to enable techniques for, or in which can be embodied, interactive textiles. Alternatively or in addition, computing system 1200 can be implemented with any one or combination of hardware, firmware, or fixed logic circuitry that is implemented in connection with processing and control circuits which are generally identified at 1212. Although not shown, computing system 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1200 also includes computer-readable media 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1200 can also include a mass storage media device 1216.

Computer-readable media 1214 provides data storage mechanisms to store device data 1204, as well as various device applications 1218 and any other types of information and/or data related to operational aspects of computing system 1200. For example, an operating system 1220 can be maintained as a computer application with computer-readable media 1214 and executed on processors 1210. Device applications 1218 may include a device manager, such as any form of a control application, software application, signal-processing and control module, code that is native to a particular device, a hardware abstraction layer for a particular device, and so on.

Device applications 1218 also include any system components, engines, or managers to implement interactive textiles. In this example, device applications 1218 include gesture manager 218.

CONCLUSION

Although embodiments of techniques using, and objects including, interactive textiles have been described in language specific to features and/or methods, it is to be understood that the subject of the appended claims is not necessarily limited to the specific features or methods described. Rather, the specific features and methods are disclosed as example implementations of interactive textiles.

What is claimed is:

1. A flexible object comprising:
    an interactive textile integrated within the flexible object, the interactive textile comprising a grid of conductive thread woven into the interactive textile;
    a textile controller coupled to the grid of conductive thread, the textile controller configured to:
    detect touch-input on the grid of conductive thread by detecting a change in capacitance between crossing conductive threads when an object touches the grid of conductive thread at a position corresponding to the crossing conductive threads; and
    process the touch-input to provide touch data usable to control a computing device or an application at the computing device.

2. The flexible object recited in claim 1, wherein the flexible object is made from a fabric.

3. The flexible object as recited in claim 1, wherein the conductive thread comprises a conductive wire twisted with a flexible thread.

4. The flexible object as recited in claim 3, wherein the conductive wire comprises a copper wire, a gold wire, or a silver wire.

5. The flexible object as recited in claim 3, wherein the flexible thread comprises a cotton thread, a wool thread, a silk thread, a nylon thread, or a polyester thread.

6. The flexible object as recited in claim 3, wherein the conductive wire is insulated.

7. The flexible object as recited in claim 3, wherein the interactive textile includes a first textile layer, a second textile layer, and a third textile layer;
    the first textile layer comprising first conductive threads of the grid of conductive threads;
    the second textile layer comprising second conductive threads of the grid of conductive threads that are positioned substantially orthogonal to the first conductive threads; and
    the third textile layer not including conductive threads, and positioned between the first textile layer and the second textile layer to prevent the first conductive threads from making direct contact with the second conductive threads.

8. The flexible object as recited in claim 1, wherein the grid of conductive thread comprises first conductive threads and second conductive threads positioned substantially orthogonal to the first conductive threads.

9. The flexible object as recited in claim 8, wherein the textile controller is configured to detect the touch-input by:
    charging the first conductive threads and charging the second conductive threads by applying a control signal to both the first conductive threads and the second conductive threads; and
    detecting a change in capacitance on a corresponding first conductive thread and a corresponding second conductive thread when the touch-input is received.

10. The flexible object as recited in claim 9, wherein the textile controller is configured to process the touch-input by:
    determining a position of the touch-input as an intersection point between the corresponding first conductive thread and the corresponding second conductive thread on the grid of conductive thread.

11. The flexible object as recited in claim 8, wherein the textile controller is configured to detect the touch-input by:
    charging the first conductive threads by applying a control signal to the first conductive threads to cause the first conductive threads to capacitively couple to the second conductive threads; and
    scanning the second conductive threads to detect a change in capacitance on a corresponding second conductive thread when the touch-input is received.

12. The flexible object as recited in claim 11, wherein the textile controller is configured to process the touch-input by determining a position of the touch-input based on the corresponding second conductive thread on which the change in capacitance is detected.

13. The flexible object as recited in claim 1, further comprising a network interface configured to communicate the touch data over a network to a gesture manager implemented at the computing device to enable the gesture manager to control the computing device or the application at the computing device based on the touch data.

14. The flexible object as recited in claim 1, wherein the interactive textile is integrated with an image on the flexible object, and wherein different areas of the image are mapped to different areas of the capacitive touch sensor to enable a user to initiate different controls for the computing device or the application at the computing device by touching the different areas of the image.

15. A system comprising:
    a textile comprising conductive threads woven with non-conductive threads, the conductive threads forming a grid of conductive thread in the textile;
    a textile controller configured to detect a position of touch-input on the grid of conductive thread by detecting a change in capacitance between crossing conductive threads when an object touches the grid of conductive thread at the position corresponding to the crossing conductive threads; and
    a network interface configured to communicate the position of the touch-input over a network to a computing device to control the computing device.

16. The system as recited in claim 15, further comprising a gesture manager implemented at the computing device, the gesture manager configured to:
    receive the position of the touch-input; and
    control the computing device, or an application at the computing device, based on the touch input.

17. The system as recited in claim 15, wherein the textile is attached to an article of clothing or is part of the article of clothing.

18. A method comprising:
   detecting touch-input to a grid of conductive thread woven into an interactive textile integrated within a flexible object by detecting a change in capacitance between crossing conductive threads when an object touches the grid of conductive thread at a position corresponding to the crossing conductive threads;
   generating touch data based on the touch-input, the touch data comprising the position of the touch-input on the grid of conductive thread; and
   communicating the touch data to a computing device to control the computing device or one or more applications at the computing device.

19. The method as recited in claim 18, wherein the grid of conductive thread comprises first conductive threads and second conductive threads positioned substantially orthogonal to the first conductive threads.

20. The method as recited in claim 18, wherein the detecting touch-input comprises detecting the touch-input using self-capacitance sensing or using projected capacitance sensing.

\* \* \* \* \*